United States Patent

[11] 3,523,517

| [72] | Inventor | John F. Corbani |
| --- | --- | --- |
| | | Santa Barbara, California |
| [21] | Appl. No. | 757,235 |
| [22] | Filed | Sept. 4, 1968 |
| [45] | Patented | Aug. 11, 1970 |
| [73] | Assignee | Sloan Instruments Corporation |
| | | Santa Barbara, California |
| | | a Corp. of California |

[54] ROTATING WORKPIECE HOLDER
6 Claims, 3 Drawing Figs.

| [52] | U.S. Cl. | 118/500 |
| --- | --- | --- |
| [51] | Int. Cl. | B05C11/14 |
| [50] | Field of Search | 118/319, 48-49.5, 500-505; 219/158 |

[56] References Cited
UNITED STATES PATENTS

| 383,030 | 5/1888 | White | 118/503 |
| --- | --- | --- | --- |
| 2,245,425 | 6/1941 | Aungst | 118/503UX |
| 2,260,471 | 10/1941 | McLeod | 118/49 |
| 2,532,971 | 12/1950 | Van Leer et al | 118/49.1X |
| 3,128,205 | 4/1964 | Illsley | 118/49 |
| 3,442,572 | 5/1969 | Illsley et al | 118/49X |

*Primary Examiner*— Morris Kaplan
*Attorney*— Evert A. Autrey

ABSTRACT: An easily actuated workpiece holder is provided which moves parts around a figure of revolution at the same time that the parts are rotating about an axis which is sharply inclined with respect to the axis of the figure of revolution.

Patented Aug. 11, 1970 3,523,517

INVENTOR.
JOHN F. CORBANI
BY E. A. Autrey
HIS ATTORNEY

ROTATING WORKPIECE HOLDER

This invention relates generally to workpiece holders and particularly to holders in which workpieces are rotated simultaneously about two separate axes while being processed.

In the vacuum evaporation of various materials onto substrates or workpieces it is important that the coatings applied be uniform and of the same thickness. The uniformity of films evaporated from a stationary source onto stationary substrates over any appreciable area is generally poor because the sources used do not generate uniform beams over wide angles and because it is difficult, in the limited confines of the usual vacuum chamber, to arrange all substrates so they present exactly the same aspect to the source. One method of reducing the non-uniformity of evaporated coatings is to move the substrates while the evaporation is proceeding and thereby even out variations. The methods of moving objects in a vacuum chamber heretofore tried have been complicated and difficult to operate and required amounts of energy not readily introduced into high vacuum equipment.

In the instant invention, the substrates or workpieces are mounted in wheels which rotate about their axis as they are moving about a conical figure of revolution. A frictional drive is employed with low energy loss and the wheels are held to their track so that collisions between wheels can not displace or damage the parts being processed.

An object of this invention is to provide a workpiece holder for moving parts in process about two axes of rotation simultaneously.

A second object is to provide a simple moving workpiece holder which may be efficiently actuated.

A further object of the invention is to provide a rotating workpiece holder which is not subject to jamming or malfunctioning and which can be set up and disassembled readily for rapid loading, processing, and unloading of parts.

Other objects and many of the attendant advantages of this invention will be readily appreciated as the same becomes better understood by reference to the following description.

Figure 1:
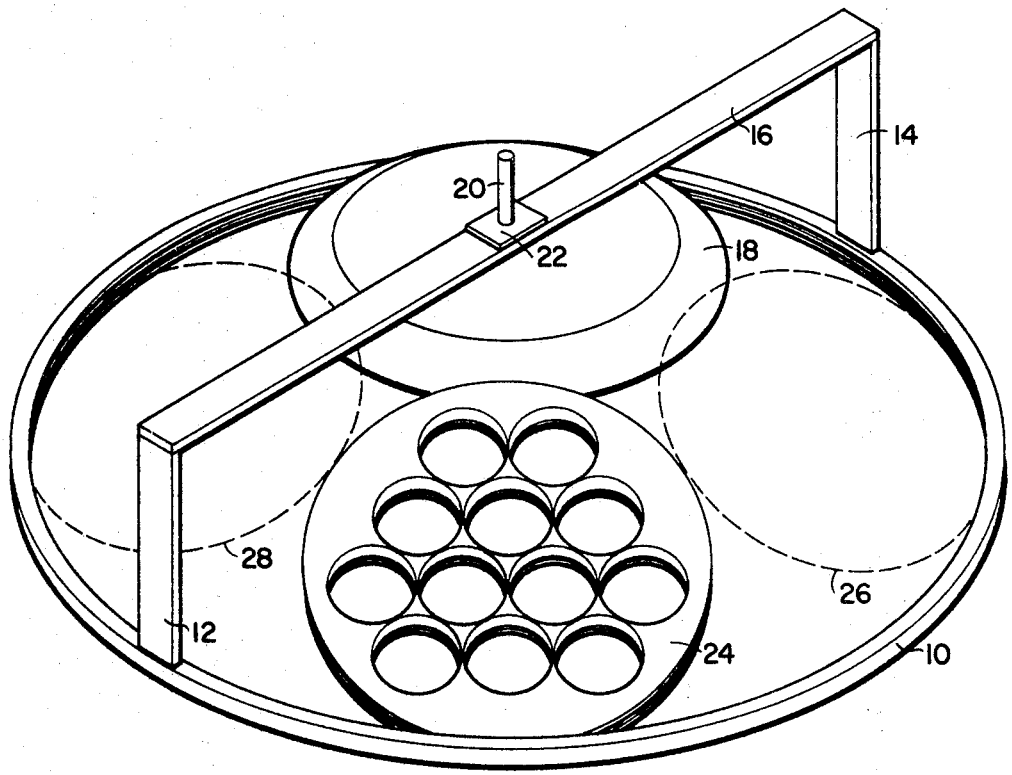
FIGURE 1 is a view in perspective showing the various elements of the invention.

The substrate holder shown in FIGURE 1 comprises a frame made up of track support 10, uprights 12 and 14, and crossbar 16. Driving cone 18 is secured to stub shaft 20 and this assembly is rotatably mounted on crossbar 16; a conventional ball or sleeve type bearing, not shown, under plate 22 serves to withstand the limited thrust involved and to permit free rotation of the shaft in a manner well known to workers in the art. Wheel 24 is provided with flanged openings and rests on driving cone 18 and on a track in track support 10 as hereinafter explained. A number of wheels are usually placed in the frame for each processing step; the dashed lines indicate the position of additional wheels 26 and 28.

Figure 2:
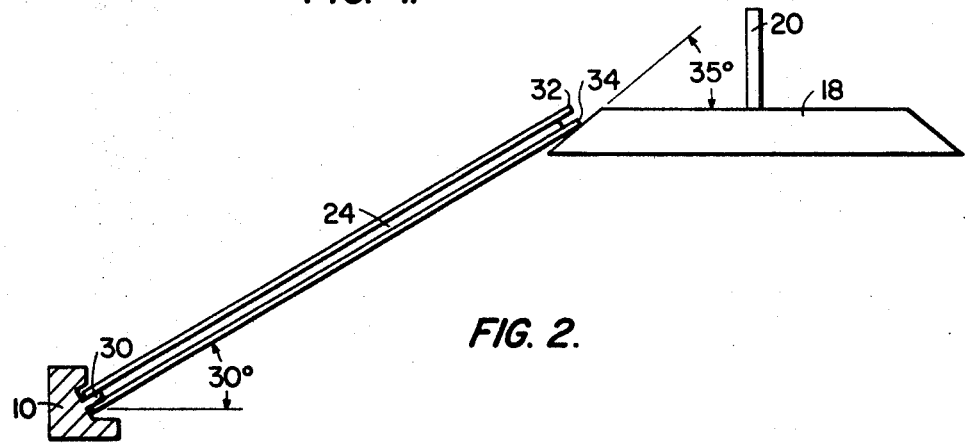
FIGURE 2 is a view, partly in section, showing the relationship of the track and wheels and driving cone to each other.

The relationship of wheel 24 to driving cone 18 and track 30 in track support 10 are shown in FIGURE 2. The height of cone 18 relative to track support 10 is such that wheel 24 makes an angle of about 30° with respect to the horizontal plane of said track. This angle is not critical, but it is desirable that the face angle of cone 18 be greater than the angle of the wheel so that the outer rim of wheel 24 contacts cone 18 at a single point at any given time for low friction losses. The wheel thus makes contact at the upper and lower ends over very limited areas. A metal wheel rolling on a metal track is highly efficient as is shown by the fact that when the holder is put into motion and the rotating force is removed, it will coast for a number of revolutions with the speed decreasing very gradually. In a typical arrangement the outer diameter of track support 10 is 23 inches for use in a bell jar having an inner diameter of 24 inches. The wheel diameter for this size of ring may conveniently be on the order of nine inches outer diameter with the driving cone 18 having an effective diameter of seven inches at the contact point.

Although wheel 24 rotates freely on track 30, it strongly resists any action tending to derail it or knock it awry. This is so because the two flanges 32 and 34 making up the wheel rim limit wheel motion relative to the track. A force tending to raise the upper part of wheel 24 from drive cone 18 results in the contact of flanges 32 and 34 with track 30 at points away from the tangent point where the wheel normally rolls along the track. Since the wheel has no freedom to twist or to lift at either the lower or upper end but has nearly perfect freedom to roll around on track 30 and cone 18, it is possible to operate the rotating holder without spacing spiders and without any driving means other than driving cone 18.

Figure 3:
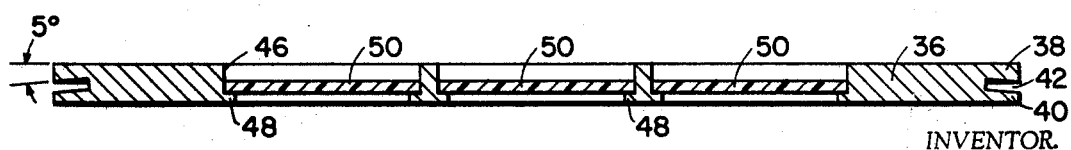
FIGURE 3 is a view in section of a single wheel showing the track engaging opening and showing substrates mounted in operating position.

The wheel 36 shown in FIGURE 3 is provided with flanges 38 and 40 which define an opening 42. The inner edges of opening 42 are angles at about 5° relative to the flat surfaces of the wheel. When this wheel configuration is fitted to a track, the uppermost flange 38 is very close to the upper surface of the track so that the wheel has essentially no freedom at all to twist on the track. The counterbored openings 46 in wheel 36 are provided with ledges 48 which hold substrates 50 in position.

In operation, the rotating workpiece holder is mounted over a conventional source, which in a vacuum system may be a heated crucible or a filament for the evaporation of gold, for example. The source, not shown in the figures, is located below the level of track support 10 and centered. The source need not be located with great precision because the rotation of the workpieces about two axes cancels out effects due to the nonuniform distribution of vapors. In fact it is often advantageous to position the source so that it is not on a line perpendicular to the center of any wheel. For example, substrates with a number of etched or screened layers may not have a perfectly plane surface but will show valleys and plateaus. The projection of a coating material traveling in a line of sight manner normal to the face of such a substrate, as is true of most depositions in a vacuum, will result in a very thin coating on the side walls of the plateaus since they are essentially shielded from the vapor by being at right angles to the deposition path. If such thin coatings are not desired, it is possible to raise or lower the source so that the source will look at the plateau side walls and thus deposit material thereon. The two degrees of rotation provided by the rotating workpiece holder ensure that coatings are uniformly thick on all surfaces presenting the same aspect as the source. The wheels, which may be loaded either before or after they are positioned on the track, may be set in place by contacting drive cone 18 with the upper part of the wheel to establish the correct angle and lowering the wheel until it is properly seated on the track. Power for rotating the holder is applied through stub shaft 20. If a metal bell jar is used on the vacuum system it is convenient to rotate shaft 20 by means of a rotary feed through in the top end of the bell jar. Since the amount of power required is rather small, a simple chain drive may be readily adapted for driving the rotating workpiece holder in a glass bell jar using a conventional baseplate rotary feedthrough. Alternatively, a small motor may be connected to the shaft inside the bell jar. A typical rotational speed for driving cone 18 in a 24-inch diameter system is about 25 to 100 revolutions per minute which means that the wheels travel around the track at about 6 to 25 revolutions per minute and the wheels themselves rotate at the rate of about 15 to 60 revolutions per minute. After the substrates have been coated, the wheels may be removed from the holder by sliding them upwardly along the driving cone until the flanges of the wheel are clear of the track. Since the workpieces may be held in the counterbored openings by gravity alone, and since the wheels are slid in and out of position rapidly with no spacers or gears to contend with, the loading and unloading times are reduced to a minimum. The dimensions of the various parts of the holder may be scaled up or down and the holder may be used, of course, either in or out of a vacuum.

Obviously, many modifications and variations of the present invention are possible in the light of the above teachings. It is therefore to be understood that within the scope of the appended claims the invention may be practiced otherwise than as specifically described.

I claim:
1. A rotating workpiece holder comprising:
   a. a frame;
   b. a horizontally disposed, circular-track mounted on said frame;
   c. a horizontally disposed, rotatable driving cone centrally and upwardly located with respect to said track;
   d. at least one workpiece holding wheel, an edge of which overlies an edge of said driving cone in a frictional-drive engagement therewith; and
   e. a pair of peripheral flanges on said wheel defining a track engaging opening whereby said wheel may simultaneously be rotated about its own axis and orbited about said driving cone.

2. The rotating workpiece holder of Claim 1 wherein said driving cone is positioned relative to said track such that said workpiece holding wheel defines an angle of about 30° relative to the plane of said track.

3. The rotating workpiece holder of Claim 1 wherein the inner edges of said track engaging opening are at an angle relative to the flat surfaces of said wheel.

4. The rotating workpiece holder of Claim 3 wherein said last recited angle is about 5°.

5. The rotating workpiece holder of Claim 1 wherein said track engaging opening is large enough for said wheel to roll freely in a given orientation about a conical figure of revolution but small enough so that said wheel has substantially no freedom to assume any other orientation.

6. The rotating workpiece holder of Claim 1 wherein said wheel defines one angle relative to said track and the face angle of said driving cone defines a greater angle whereby said wheel contacts said cone at a single point.